(12) United States Patent
Srinivasan

(10) Patent No.: US 11,544,149 B2
(45) Date of Patent: Jan. 3, 2023

(54) SYSTEM AND METHOD FOR IMPROVED FAULT TOLERANCE IN A NETWORK CLOUD ENVIRONMENT

(71) Applicant: ORACLE INTERNATIONAL CORPORATION, Redwood Shores, CA (US)

(72) Inventor: Parthasarathy Srinivasan, American Fork, UT (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 80 days.

(21) Appl. No.: 17/142,995

(22) Filed: Jan. 6, 2021

(65) Prior Publication Data

US 2021/0208971 A1 Jul. 8, 2021

Related U.S. Application Data

(60) Provisional application No. 63/000,097, filed on Mar. 26, 2020, provisional application No. 62/957,976, filed on Jan. 7, 2020.

(51) Int. Cl.
*G06F 11/14* (2006.01)
*G06F 9/50* (2006.01)
*G06F 11/30* (2006.01)

(52) U.S. Cl.
CPC ........ *G06F 11/1423* (2013.01); *G06F 9/5072* (2013.01); *G06F 9/5077* (2013.01); *G06F 11/1484* (2013.01); *G06F 11/3006* (2013.01)

(58) Field of Classification Search
CPC .............. G06F 11/1484; G06F 11/008; G06F 11/3006; G06F 11/1423; G06F 11/326
See application file for complete search history.

(56) References Cited

U.S. PATENT DOCUMENTS

| | | | |
|---|---|---|---|
| 7,702,966 B2 * | 4/2010 | Chandwani | G06F 11/0793 714/47.1 |
| 10,594,784 B2 * | 3/2020 | Kansal | H04L 67/14 |
| 2015/0066431 A1 * | 3/2015 | Zheng | A61B 6/586 702/183 |

\* cited by examiner

*Primary Examiner* — Nadeem Iqbal
(74) *Attorney, Agent, or Firm* — Tucker Ellis LLP

(57) ABSTRACT

Described herein are systems and methods for fault tolerance in a network cloud environment. In accordance with various embodiments, the present disclosure provides an improved fault tolerance solution, and improvement in the fault tolerance of systems, by way of failure prediction, or prediction of when an underlying infrastructure will fail, and using the predictions to counteract the failure by spinning up or otherwise providing new component pieces to compensate for the failure.

17 Claims, 7 Drawing Sheets

SYSTEM AND METHOD FOR IMPROVED FAULT TOLERANCE IN A NETWORK CLOUD ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application titled "A PROBABILISTIC/STATISTICAL SOFTWARE COMPONENT FOR IMPROVING FAULT TOLERANCE IN A NETWORK CLOUD ENVIRONMENT", Application No. 62/957,976, filed on Jan. 7, 2020; and U.S. Provisional Patent Application titled "SYSTEM AND METHOD FOR IMPROVED FAULT TOLERANCE IN A NETWORK CLOUD ENVIRONMENT", Application No. 63/000,097, filed on Mar. 26, 2020; each of which above applications are herein incorporated by reference.

TECHNICAL FIELD

Embodiments of the invention are generally related to computer networks. More particularly, the present disclosure relates to methods for providing fault tolerance in network cloud environments.

BACKGROUND

Cloud infrastructure environments can comprise sets of complementary cloud services that enable users and clients (throughout the specification, the terms "clients" and "customers" can be used interchangeably) to build and run a wide range of applications and services in a highly-available hosted environment.

Year to year, more and more businesses and organizations are migrating mission critical applications and systems to a cloud infrastructure environment. There are various reasons for this shift. For example, many businesses are moving to the cloud in order to reduce the cost and complexity of operating, maintaining, and building out on-premise infrastructure. As well, cloud infrastructure also allows for a more rapid information technology (IT) delivery mechanism. Some businesses and organizations additionally see the cloud infrastructure environment as a means to gain a leg up on competition by adapting to a nimbler system.

Within IaaS (Infrastructure as a Service) models, a cloud provider can provide, host, and manage infrastructure components that would, in traditional settings, be on-premise at each customer's/client's location. Such traditionally on-premise components can include hardware, for example, data warehouses and data centers, servers, storage, networking hardware, as well as software, such as virtualization software.

IaaS providers can, in addition to providing hardware and software that would traditionally be on-premise, also provide services to their clients and customers. As an example, clients and customers can be allowed to tailor their IaaS subscription to fit their needs, which then in turn allows for detailed and broken-down billing and invoicing. IaaS can also support features such as load balancing, redundancy, replication and recover. Because such services are offered and supported by the IaaS provider (and not the customer), this leaves clients and customers to be more focused on improving their business by pushing more into automation and orchestration for their services.

Cloud infrastructures enable users and clients to seamlessly run traditional enterprise applications along with cloud-native apps, all on the same platform, reducing operational overhead and enabling direct connectivity between both types of workloads.

A computer network provides connectivity among a set of nodes. The set of nodes are connected by a set of links (physical or virtual). The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Each node performs one or more functions, such as but not limited to routing data, filtering data, inspecting data, processing data, and/or storing data. Each node may be implemented by a function-specific hardware device and/or a generic machine.

Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

Some currently-available systems have some level of fault tolerance. That is, if any of the components fail, such systems have failover capabilities to pick up a thread from where the component failed and continue providing service.

A general approach in on-premise systems is to build redundancy into the components. Current cloud-based systems may be focused on building more and more redundancy for fault tolerance. Redundancy depends upon the underlying infrastructure, and can follow a deterministic failure model for on-premise systems. However, when fault tolerant components are deployed on the cloud, the underlying infrastructure behaves in a probabilistic/random manner, and not deterministic as in an on-premise environment.

SUMMARY

Described herein are systems and methods for fault tolerance in a network cloud environment. In accordance with various embodiments, the present disclosure provides an improved fault tolerance solution, and improvement in the fault tolerance of systems, by way of failure prediction, or prediction of when an underlying infrastructure will fail, and using the predictions to counteract the failure by spinning up or otherwise providing new component pieces to compensate for the failure.

In accordance with an embodiment, a method for fault tolerance in a network cloud environment is described. The method can provide a network cloud environment having deployed thereon an application utilizing a plurality of sockets of the network cloud environment. The method can provide a fault tolerance module of the network cloud, the fault tolerance module comprising a monitoring component and a pattern recognition component. The method can monitor and record, by the monitoring component, a plurality of faults at the plurality of sockets, each fault being time-stamped. The method can output, by the monitoring component, a representation of the plurality of faults to the pattern recognition module. The method can build, by the pattern recognition module and based upon the representation of the plurality of faults, a failure model. The method can build, by the pattern recognition module, a number of new sockets for use by the application, the number of new sockets being based upon the failure model.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus, functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

As described above, cloud infrastructure environments can comprise sets of complementary cloud services that enable users and clients to build and run a wide range of applications and services in a highly-available hosted environment.

Figure 1:
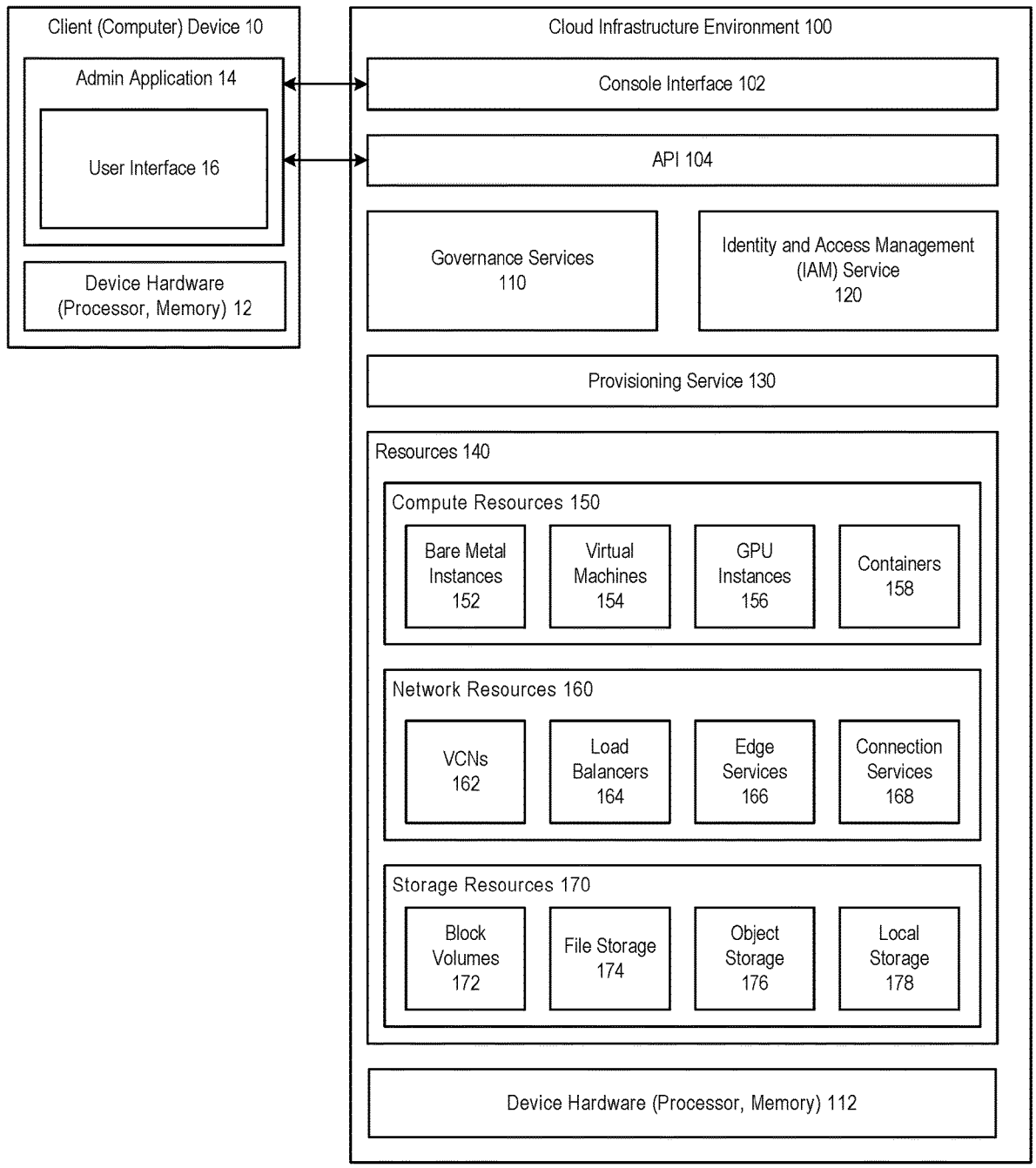
FIG. 1 shows a system for providing a cloud infrastructure environment, in accordance with an embodiment.

FIG. 1 shows a system for providing a cloud infrastructure environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the cloud infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the loud infrastructure entitlements and compartments.

In accordance with an embodiment, the identity and access management service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controller through, for example, the console interface or via one or more APIs, such as API 104. The provisioning service can allow for lets clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by an cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, GPU instances 156, and containers 158. The compute resources layer can be used to, for example, provision and manage bare metal compute instances, provision instances as needed to deploy and run applications, just as in an on-premises data center.

In accordance with an embodiment, the cloud infrastructure environment can provide control of one or more physical host ("bare metal") machines within the compute resources layer. Bare metal compute instances run directly on bare metal servers without a hypervisor. When ca bare metal compute instance is provisioned, the client can maintain sole control of the physical CPU, memory, and network interface card (NIC). The bar metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network—including subnets, route tables, and gateways—on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balancers can provide a public or private IP address, and provisioned bandwidth.

In accordance with an embodiment, a load balancer can improve resource utilization, scaling, and help ensure high availability. Multipole load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can creates a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balancers can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid-state drives for I/O intensive applications. These can be provided, for example, within bare metal instances. Local storage provides high storage performance for VM's and bare metal compute instances. Some examples include relational databases, data warehousing, big data, analytics, AI and HPC application.

Distributed Data Grid in a Cloud

A distributed data grid is a system in which a collection of computer servers work together in one or more clusters to manage information and related operations, such as computations, within a distributed or clustered environment. Such distributed data grids, when hosted within a cloud, provide exemplary embodiments in which the described systems and methods for improved fault tolerance can be utilized.

In accordance with an embodiment, a distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

Figure 2:
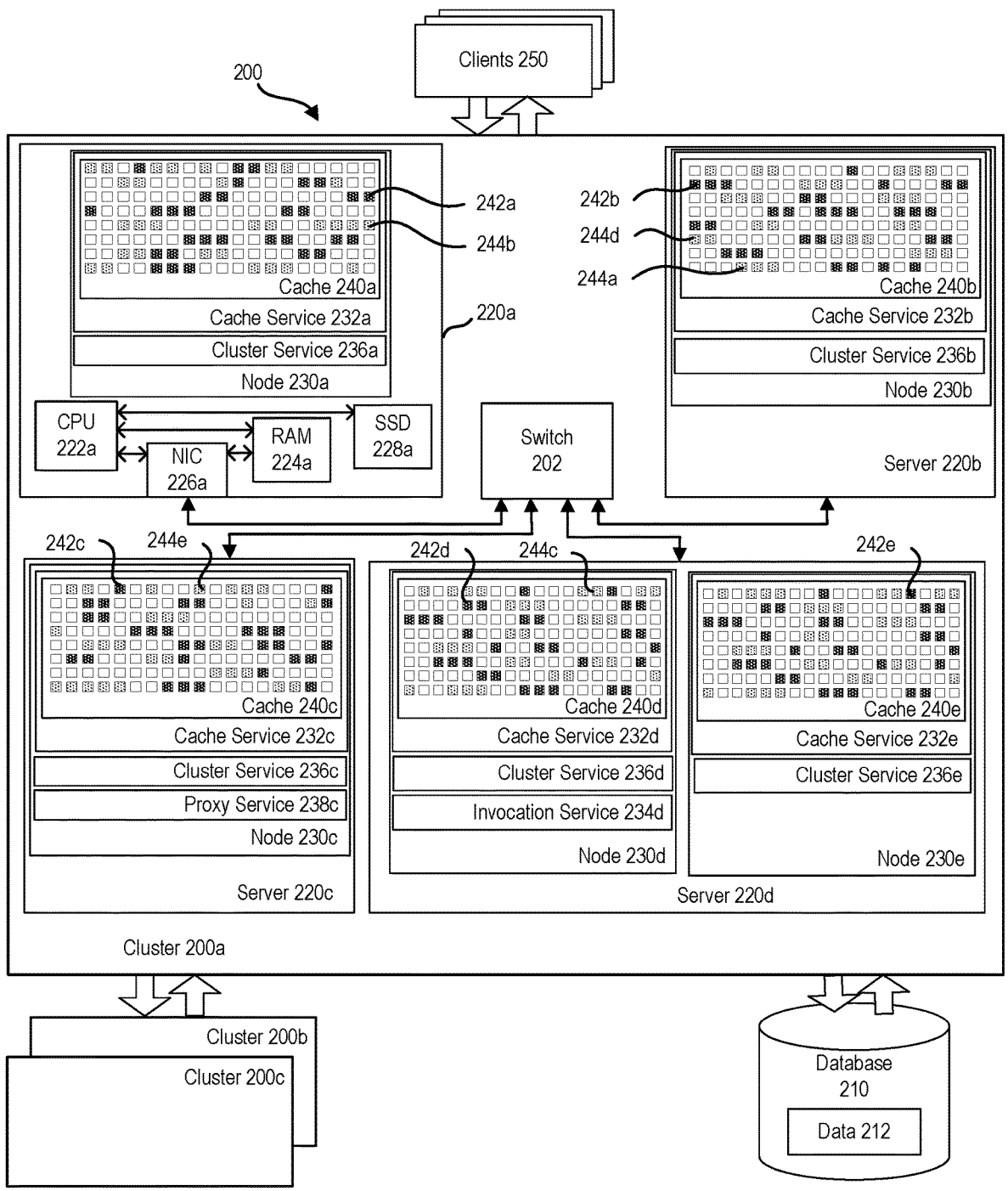
FIG. 2 illustrates and example of a distributed data grid, in accordance with an embodiment.

FIG. 2 illustrates and example of a distributed data grid 200 which stores data and provides data access to clients 250. A "data grid cluster", or "distributed data grid", is a system comprising a plurality of computer servers (e.g., 220a, 220b, 220c, and 220d) which work together in one or more cluster (e.g., 200a, 200b, 200c) to store and manage information and related operations, such as computations, within a distributed or clustered environment. While distributed data grid 200 is illustrated as comprising four servers 220a, 220b, 220c, 220d, with five data nodes 230a, 230b, 230c, 230d, and 230e in a cluster 200a, the distributed data grid 200 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 200 implements the present invention, described for example in the summary above and the detailed description below.

As illustrated in FIG. 2, a distributed data grid provides data storage and management capabilities by distributing data over a number of servers (e.g., 220a, 220b, 220c, and 220d) working together. Each server of the data grid cluster may be a conventional computer system such as, for example, a "commodity x86" server hardware platform with one to two processor sockets and two to four CPU cores per processor socket. Each server (e.g., 220a, 220b, 220c, and 220d) is configured with one or more CPU, Network Interface Card (NIC), and memory including, for example, a minimum of 4 GB of RAM up to 64 GB of RAM or more. Server 220a is illustrated as having CPU 222a, Memory 224a and NIC 226a (these elements are also present but not shown in the other Servers 220b, 220c, 220d). Optionally each server may also be provided with flash memory—e.g. SSD 228a—to provide spillover storage capacity. When provided the SSD capacity is preferably ten times the size of the RAM. The servers (e.g., 220a, 220b, 220c, 220d) in a data grid cluster 200a are connected using high bandwidth NICs (e.g., PCI-X or PCIe) to a high-performance network switch 220 (for example, gigabit Ethernet or better).

A cluster 200a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 202 which provides single hop communication between servers. A cluster may thus be limited by the number of ports on the switch 202. A typical cluster will therefore include between 4 and 96 physical servers.

In most Wide Area Network (WAN) configurations of a distributed data grid 200, each data center in the WAN has independent, but interconnected, data grid clusters (e.g., 200a, 200b, and 200c). A WAN may, for example, include many more clusters than shown in FIG. 2. Additionally, by using interconnected but independent clusters (e.g., 200a, 200b, 200c) and/or locating interconnected, but independent, clusters in data centers that are remote from one another, the distributed data grid can secure data and service to clients 250 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 230a, 230b, 230c, 230d and 230e) operate on each server (e.g., 220a, 220b, 220c, 220d) of a cluster 200a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 236a, 236b, 236c, 236d, 236e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 238c) allows connections (e.g. using TCP) from clients that run outside the cluster. The invocation Service (e.g., 234d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 232a, 232b, 232c, 232d, 232e) is the service which provides for data storage in the distributed data grid and is operative on all nodes of the cluster that read/write/store cache data, even if the node is storage disabled. The distributed cache service allows cluster nodes to distribute (partition) data across the cluster 200a so that each piece of data in the cache is managed primarily (held) by only one cluster node. The distributed cache service handles storage operation requests such as put, get, etc. The distributed cache service manages distributed caches (e.g., 240a, 240b, 240c, 240d, 240e) defined in a distributed schema definition and partitioned among the nodes of a cluster.

A partition is the basic unit of managed data in the distributed data grid and stored in the distributed caches (e.g., 240a, 240b, 240c, 240d, and 240e). The data is logically divided into primary partitions (e.g., 242a, 242b, 242c, 242d, and 242e), that are distributed across multiple cluster nodes such that exactly one node in the cluster is responsible for each piece of data in the cache. Each cache (e.g., 240a, 240b, 240c, 240d, and 240e) can hold a number of partitions. Each partition (e.g., 242a, 242b, 242c, 242d, 242e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 2, each partition is stored in a primary partition (e.g., dark shaded squares 242a, 242b, 242c, 242d, and 242e) and one or more synchronized backup copy of the partition (e.g., light shaded squares 244a, 244b, 244c, 244d, and 244e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 242a, 242b, 242c, 242d, 242e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 210 comprising data 212. The data 212 in database 210 is serialized, partitioned and distributed among the nodes of the distributed data grid.

Distributed data grid 200 stores data objects created from data 212 from database 210 in partitions in the memory of servers 220a, 220b, 220c, 220d such that clients 250 and/or applications in data grid 200 can access those data objects directly from memory. Reading from and writing to the data objects in the distributed data grid 200 is much faster and allows more simultaneous connections than could be achieved using the database 210 directly. In-memory replication of data and guaranteed data consistency make the distributed data grid suitable for managing transactions in memory until they are persisted to an external data source such as database 210 for archiving and reporting. If changes are made to the data objects in memory the changes are synchronized between primary and backup partitions and may subsequently be written back to database 210 using asynchronous writes (write behind) to avoid bottlenecks.

Although the data is spread out across cluster nodes, a client 250 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 250, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid-state devices (e.g. SSD 228a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 228a) while having the index/memory tree stored in memory (e.g. RAM 224a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Multi-Tenant Application Servers in a Cloud

Application servers generally provide a managed environment within which software applications can be deployed and run. Such cloud-based application servers provide another exemplary environment in which the described systems and methods for improved fault tolerance can be utilized. Cloud-based environments allow applications to run within and take advantage of the distributed resources provided by a cloud. Such environments can support large numbers of users or tenants, some of which may have specific requirements that are particular to that user or tenant.

In accordance with an embodiment, such cloud-based application servers can support multi-tenancy in an application server, cloud, on- or other environment, which enables categories of components and configurations to be associated with particular application instances or partitions. Resource group templates define, at a domain level, collections of deployable resources that can be referenced from resource groups. Each resource group is a named, fully-qualified collection of deployable resources that can reference a resource group template. A partition provides an administrative and runtime subdivision of the domain, and contains one or more resource groups. Each resource group can reference a resource group template, to bind deployable resources to partition-specific values, for use by the referencing partition. A tenant of the application server or cloud environment can be associated with a partition, or applications deployed therein, for use by that tenant.

For example, Java EE application servers, such as Oracle WebLogic Server (WLS) and Glassfish, can run Java archives with a degree of isolation. In accordance with an embodiment, a software application can be viewed as comprising a first category of components or configurations being a set of Java archives or other components that are managed at a system or domain level; and a second category being a configuration required to run those archives and managed at an application level. An instance of system or domain components can be run with several sets of instances or partitions of application components, with particular partitions mapping to particular tenants.

In accordance with an embodiment, the system can support multi-tenant use cases that provide software-as-a-service (SaaS), or platform-as-a-service (PaaS) capabilities, and require a means of distinguishing between different tenants.

For example, in a SaaS use case, the system can enable sharing of an application server infrastructure among multiple tenants, using a tenant-aware application that recognizes different tenants. Based on a user's identity, a tenant-aware application can determine the particular tenant to which the user belongs, and use that information to access a resource, such as a tenant-specific database connection or a JMS queue, that is pertinent to that particular tenant.

As another example, in a PaaS use case, the system can enable multiple tenants to run different applications, with little or no overlap between the various tenant environments, and for each particular tenant to be able to administer certain aspects of their own runtime environment, such as deploying applications for those users associated with that particular tenant.

As another example, in the case of enterprise software application environments, such as Oracle Fusion Applications, which may include applications that are not themselves tenant-aware, but it is desired to simplify the application lifecycle, the system can support usage of a single copy of an application installation which can be realized at runtime as multiple different copies. Each copy can run within its own partition and use a different classloader, allowing each copy to connect to different databases, or to different portable databases (PDB) running within a same container database (CDB).

In accordance with other embodiments, the system can also address traditional use cases, so that users can use a multi-tenant version of an application server in a similar manner as they had previously, and are not required to use any of its multi-tenancy features.

Various other use cases and examples are described in further detail below, including, for purposes of illustration, embodiments of a multi-tenant WLS application server environment (referred to herein as WLS-MT). In accordance with other embodiments, similar functionality and features can also be provided for use with other application server, cloud, on-premise, or other environments.

Figure 3:
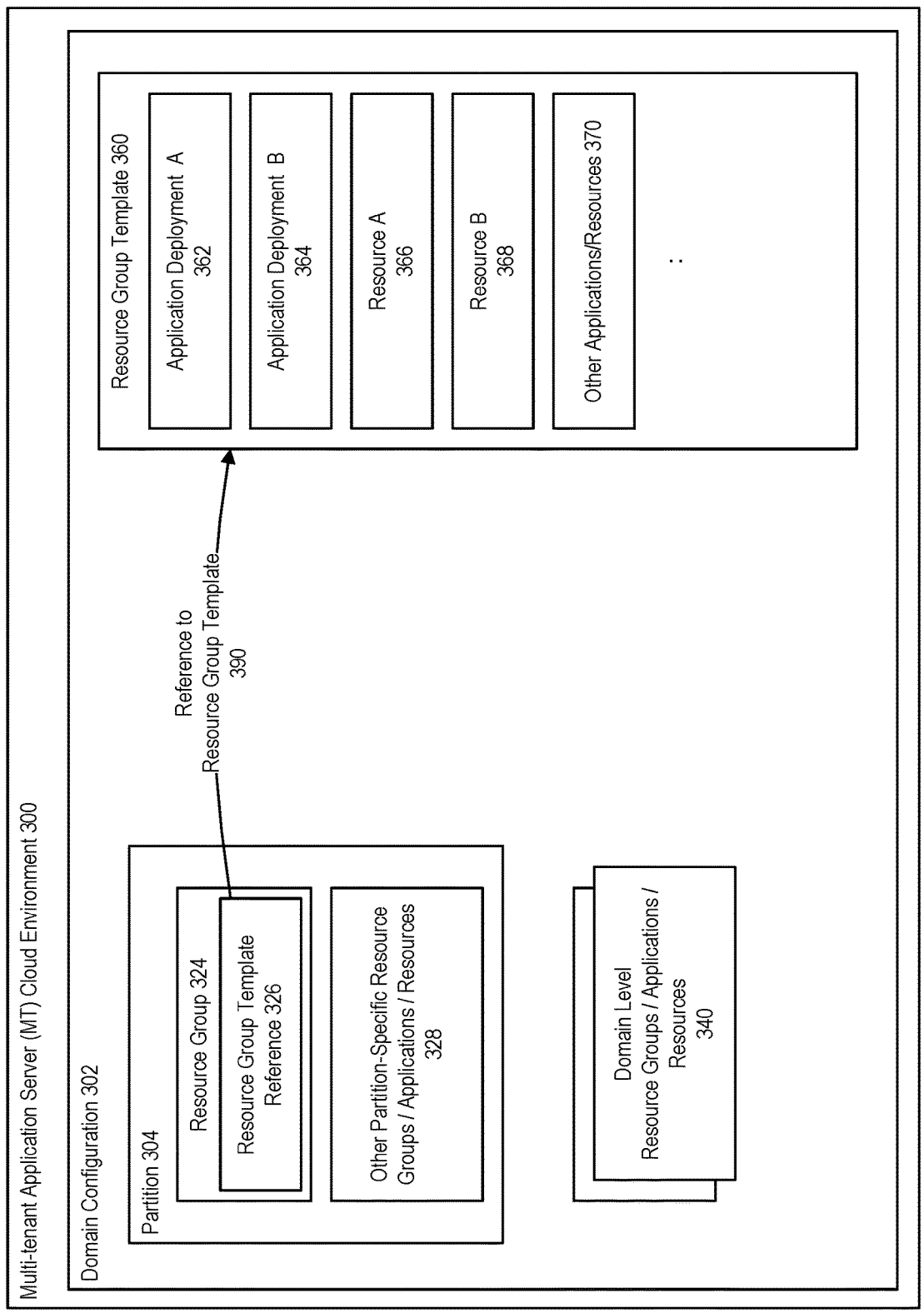
FIG. 3 illustrates a system for supporting multi-tenancy in an application server, cloud, or other environment, in accordance with an embodiment.

FIG. 3 illustrates a system for supporting multi-tenancy in an application server, cloud, or other environment, in accordance with an embodiment.

As illustrated in FIG. 3, in accordance with an embodiment, a multi-tenant application server cloud environment 300, for example an application server or other component that enables software applications to be deployed and run within the environment, can be configured to include and to operate according to an application server domain configuration 302, which is used at runtime to define an application server domain.

In accordance with an embodiment, the application server can further include one or more partitions 304 that are defined for use at runtime. Each partition can be associated with a partition identifier (ID) and configuration, and can further include one or more resource groups 324, together with a reference 390 to a resource group template 326, and/or other partition-specific applications or resources 328.

In accordance with an embodiment, additional resource groups, applications and/or resources 340 can also be defined at the domain level, optionally together with a reference to a resource group template.

In accordance with an embodiment, the application server can further include one or more resource group templates 360 that are defined for use at runtime. Each resource group template can include one or more application deployments 362, 364, resources 366, 368, and/or other deployable applications or resources 370.

In accordance with an embodiment, each resource group can reference a resource group template. For example, the illustrated resource group 324 in partition 304, can reference 190 the resource group template 360.

Generally, a system administrator can create or delete partitions, domain-level resource groups are referenceable from partitions, realms, and domain-level resource group templates. A partition administrator can typically administer various aspects of their own partition, for example, create resource groups, deploy applications to the partition, and reference specific realms for the partition.

In accordance with some embodiments, a tenant administrator role can also be defined to support tenant-level administrative tasks, although such tasks can alternatively be driven by the components themselves, and thereafter map to corresponding system-level or partition-level actions.

Fault Tolerance

In a cloud computing environment, such as the distributed data grid or the application server described above, the reliability of a network communication channel can be degraded, leading to difficulty in achieving fault tolerance. Other methods to attempt achieving the same results, for example by increasing redundancy are less efficient, costlier and may be infeasible under some circumstances.

In accordance with an embodiment, fault tolerance in cloud computing means the same thing as it does in private, hosted networks (e.g., on-premise networks). More specifically, fault tolerance implies the ability to continue providing service without interruptions even after the fault or failure of one or more components of the cloud network.

In accordance with an embodiment, an improved fault tolerance system and method can be provided. The fault tolerance component can comprise/be run as a service on one or more Java virtual machines (JVM) that proactively provisions network sockets in a cloud environment. Such cloud environments can be prone to failure.

Figure 4:
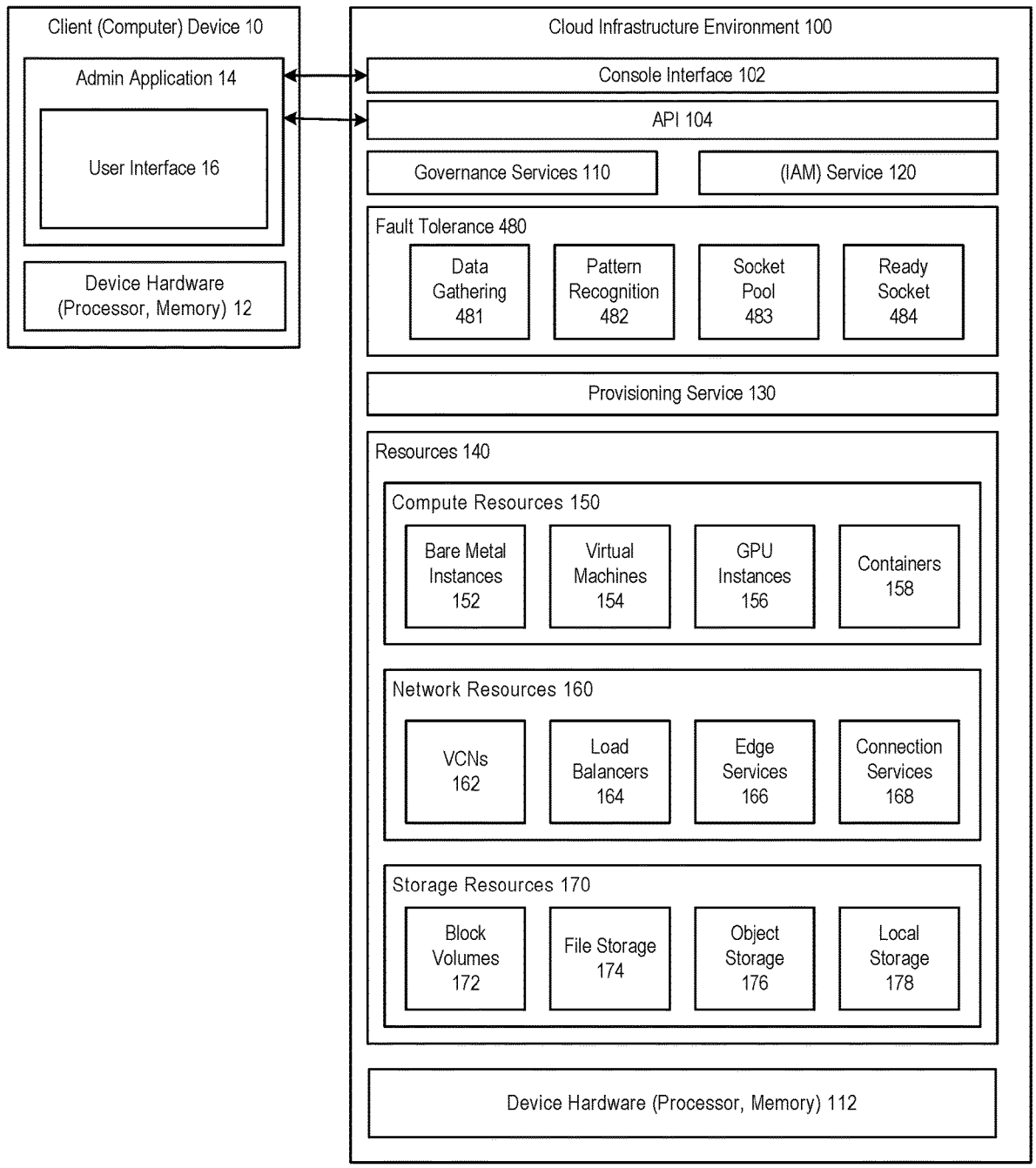
FIG. 4 shows a system for fault tolerance in a network cloud environment, in accordance with an embodiment.

FIG. 4 shows a system for fault tolerance in a network cloud environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170. The cloud environment can additionally comprise a fault tolerance module 480, which in turn can comprise a number of modules such as a data gathering module 481, a pattern recognition module 482, a socket pool module 483, and a ready socket module 484.

In accordance with an embodiment, the fault tolerance module 480, along with its subcomponent modules, can have access rights within the cloud environment such that the fault tolerance module can monitor sockets and socket failure within the cloud environment, provision/create new sockets, and deploy such new sockets within the cloud environment.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the cloud infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the loud infrastructure entitlements and compartments.

In accordance with an embodiment, the identity and access management service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controller through, for example, the console interface or via one or more APIs, such as API 104. The provisioning service can allow for lets clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by an cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, GPU instances 156, and containers 158. The compute resources layer can be used to, for example, provision and manage bare metal compute instances, provision instances as needed to deploy and run applications, just as in an on-premises data center.

In accordance with an embodiment, the cloud infrastructure environment can provide control of one or more physical host ("bare metal") machines within the compute resources layer. Bare metal compute instances run directly on bare metal servers without a hypervisor. When ca bare metal compute instance is provisioned, the client can maintain sole control of the physical CPU, memory, and network interface card (NIC). The bar metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network—including subnets, route tables, and gateways—on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balancers can provide a public or private IP address, and provisioned bandwidth.

In accordance with an embodiment, a load balancer can improve resource utilization, scaling, and help ensure high availability. Multipole load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can creates a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balancers can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid-state drives for I/O intensive applications. These can be provided, for example, within bare metal instances. Local storage provides high storage performance for VM's and bare metal compute instances. Some examples include relational databases, data warehousing, big data, analytics, AI and HPC application.

As illustrated in FIG. 4, in accordance with an embodiment, the fault tolerance module 480 can comprise a number of modules such as a data gathering module 481, a pattern recognition module 482, a socket pool module 483, and a ready socket module 484, and sub-components, for example:

A. (Socket Count) Data Gathering Module 481.
B. (Time Series) Pattern Module 482—which can comprise the following two sub-modules: Time Series Pattern (inference) model builder; and a [Socket (Count)] Failure Predictor.
C. Socket Pool Maintainer Module 483.
D. Ready Socket Consumer Module 484.

Each of which modules or components are described in further detail below.

In accordance with an embodiment, the ready socket consumer module can operate in a way that the advantage obtained by the failure prediction is not offset (in part or full) by the serialization/other processing required to handover the pre-built socket objects.

In accordance with an embodiment, the components and processes illustrated in FIG. 4, and as further described herein with regard to various embodiments, can be provided as software or program code executable by a computer system or other type of processing device. For example, in accordance with an embodiment, the components and processes described herein can be provided by a cloud computing system, or other suitably-programmed computer system. Various programming languages, such as the interspersing of Python with Java, can be used in order to ensure the above.

In accordance with an embodiment, with regard to the (socket count) data gathering module 481: this module can comprise a utility, such as a netstat (network statistics) utility (which can form an input for the data gathering module) has output entries for each network socket that is present and healthy in a system's (i.e., a system running within the cloud environment) operational environment at any given instant of time. Harnessing this information by counting the number of entries in the netstat output provides a number in proportion to the sockets that are healthy and usable for the purpose of communication between the processes (e.g., JVM(s) in the case of a distributed computing environment such as Coherence).

In a conventional environment (on premise/non-cloud systems) this number is rigorously nearly constant over a reasonable time interval and therefore precludes the need for constant adjustment for the proper functioning of the overarching fault-tolerant applications. This relation of dependence is however jeopardized in the cloud environment, wherein the underlying operational infrastructure is unable to guarantee invariance in the number of usable and healthy sockets over reasonable time intervals.

In accordance with an embodiment, the data gathering module 481 sits and collects the data of how many sockets are going down over a period of time. The data gathering module can be placed/deployed at one of the JVMs that is dependent on the underlying infrastructure. The module can leverage, if already existing in the underlying application and/or system, a netstat utility, and output a timestamp and a socket count at any particular time. The module 481 can observe the network and produce data regarding sockets, as well as faults/errors at sockets, and in relation to a total number of (operational) sockets.

In accordance with an embodiment, with regard to the time series pattern module 482: the time series pattern module, can be comprised of two sub-modules, namely a time series pattern inference model builder and socket count failure predictor.

In accordance with an embodiment, with regard to the time series pattern inference model builder: it is in the above context that the improvement provided by the mechanism described herein finds usability. Taking the count of the output of the netstat from 481, periodically on a cloud VM-OS, the module can infer an inherent pattern in the time variance of the socket count numbers. This then provides a failure model for predicting the quantum of compensation that can help the overarching fault-tolerant applications to function more consistently.

In accordance with an embodiment, with regard to the socket count failure predictor: a compensating component is essentially described as one which opens/builds a certain number of sockets based on numbers from the above pattern analysis and ships them over the wire, ready for use by the application JVM(s). This socket count failure predictor can be hosted on its own virtual machine, such as a Java VM. The reason this component needs its own independent JVM is that the time series pattern analysis component is computation intensive and needs its own resource space. This module can utilize python libraries (e.g., Shapely, StatsModels libraries) to accomplish its tasks.

In accordance with an embodiment, the data collected by the data gathering module is fed to the time-series pattern module. These two sub-modules then take the failure data, and advances specific checks (e.g., what is pattern that time series is forming). This module analyzes data by performing statistical tests. Then it automatically plots a graph and finds intersections of certain thresholds and uses those thresholds in its predictions. It can predict, for example, over time, a number of sockets that will go down on the cloud infrastructure that is present.

In accordance with an embodiment, the information is serialized and passed on. Data is formatted such that it can be shipped to other JVMs. The data is collected into the pattern recognition.

In accordance with an embodiment, with regard to the socket pool maintainer module 483: this module can proactively open sockets (e.g., datagram sockets in the case of Coherence) taking into account the numerical difference between the sockets currently available in the socket pool and that predicted to be required at that instant by the failure predictor module described above. In accordance with an embodiment, this module can be provided as part of an extended Coherence product that runs in its own thread in a while loop which lasts for the entire lifetime of the Coherence JVM In accordance with an embodiment, with regard to the ready socket consumer module 484: this module can be a socket provider thread that consumes the sockets from the socket pool maintained by the socket pool maintainer module described above. For example, in the context of a Coherence environment, this module can be a Coherence TCPDatagramSocketProvider thread that consumes the sockets from the socket pool.

Figure 5:
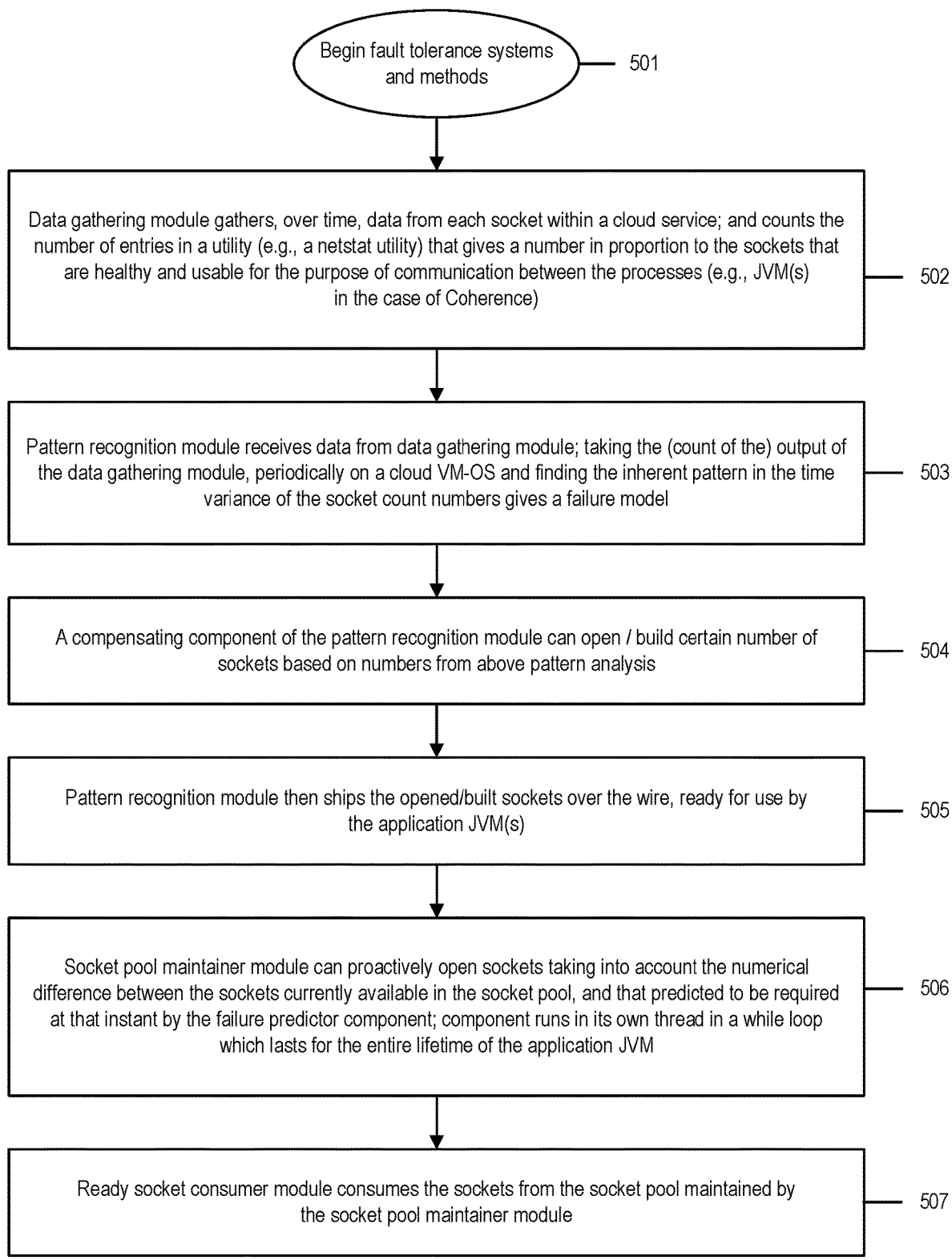
FIG. 5 is a flowchart of a method for fault tolerance in a network cloud environment, in accordance with an embodiment.

FIG. 5 is a flowchart of a method for fault tolerance in a network cloud environment, in accordance with an embodiment.

In accordance with an embodiment, at step 501, the fault tolerance systems and methods can begin.

In accordance with an embodiment, at step 502, a data gathering module gathers, over time, data from each socket within a cloud service. The data gathering module counts the number of entries in a utility (e.g., a netstat utility) that provides a number in proportion to the sockets that are healthy and usable for the purpose of communication between the processes (e.g., JVM(s) in the case of Coherence).

In accordance with an embodiment, at step 503, a pattern recognition module receives data from the data gathering module. Taking the (count of the) output of the data gathering module, periodically on a cloud VM-OS, and finding the inherent pattern in the time variance of the socket count numbers, provides a failure model.

In accordance with an embodiment, at step 504, at the pattern recognition module, a compensating component of the pattern recognition module can open/build a certain number of sockets based on the numbers from the above pattern analysis.

In accordance with an embodiment, at step 505, the pattern recognition module then ships or otherwise provides the opened/built sockets over the wire, ready for use by the application JVM(s).

In accordance with an embodiment, at step 506, a socket pool maintainer module can proactively open sockets, taking into account the numerical difference between the sockets currently available in the socket pool and that predicted to be required at that instant by the failure predictor component described above. This component can run in its own thread, in a while loop which lasts for the entire lifetime of the application JVM.

In accordance with an embodiment, at step 507, the ready socket consumer module consumes the sockets from the socket pool maintained by the socket pool maintainer module.

Figure 6:
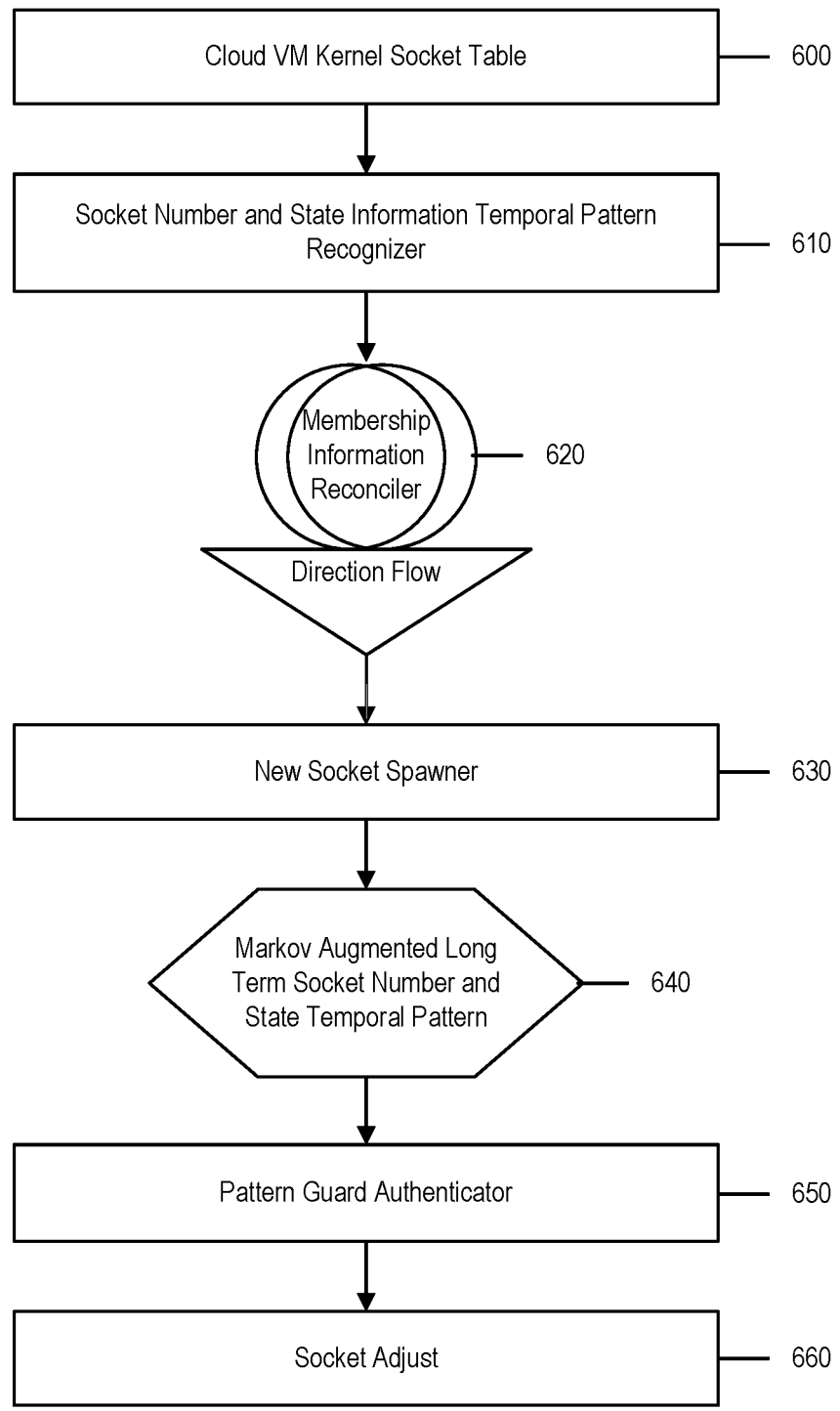
FIG. 6 is a flowchart of a method for fault tolerance in a network cloud environment, in accordance with an embodiment.

FIG. 6 is a flowchart of a method for fault tolerance in a network cloud environment, in accordance with an embodiment.

In accordance with an embodiment, a cloud VM kernel socket table can perform the functions of the data gathering module described above. This module can be placed on a system (e.g., on a JVM), and can monitor and collect fault data. The fault data that is collected can then be time-stamped.

In accordance with an embodiment, a socket number and state information temporal pattern recognizer 610 can perform the functions of the pattern module above. More specifically, data collected at cloud VM kernel socket table 600 is fed to socket number and state information temporal pattern recognizer 610. The socket number and state information temporal pattern recognizer 610 then takes the data, and advances specific checks (e.g., what is pattern that time series is forming). The pattern recognizer can analyze data by performing statistical tests. Then it automatically plots a graph and finds intersections of certain thresholds, and uses those thresholds in its predictions. The pattern recognizer can predict, for example, over time, a number of sockets that will go down on the cloud infrastructure that is present.

In accordance with an embodiment, the membership information reconciler and direction flow 620 indicates that membership information with respect to the cloud network is determined prior to the new socket spawner 630 spinning up new instances in order to prevent/mitigate the faults, or potential faults, discovered at pattern recognizer 610.

In accordance with an embodiment, at block 640, an e.g., Markov augmented long term socket number and state temporal pattern module can be run. For example, the system can use a Markov chain as a stochastic model describing a sequence of possible events in which the probability of each event depends only on the state attained in the previous event.

In accordance with an embodiment, the new sockets can be authenticated at pattern guard authenticator 650. At block 660, any adjustments to the sockets can be performed.

Figure 7:
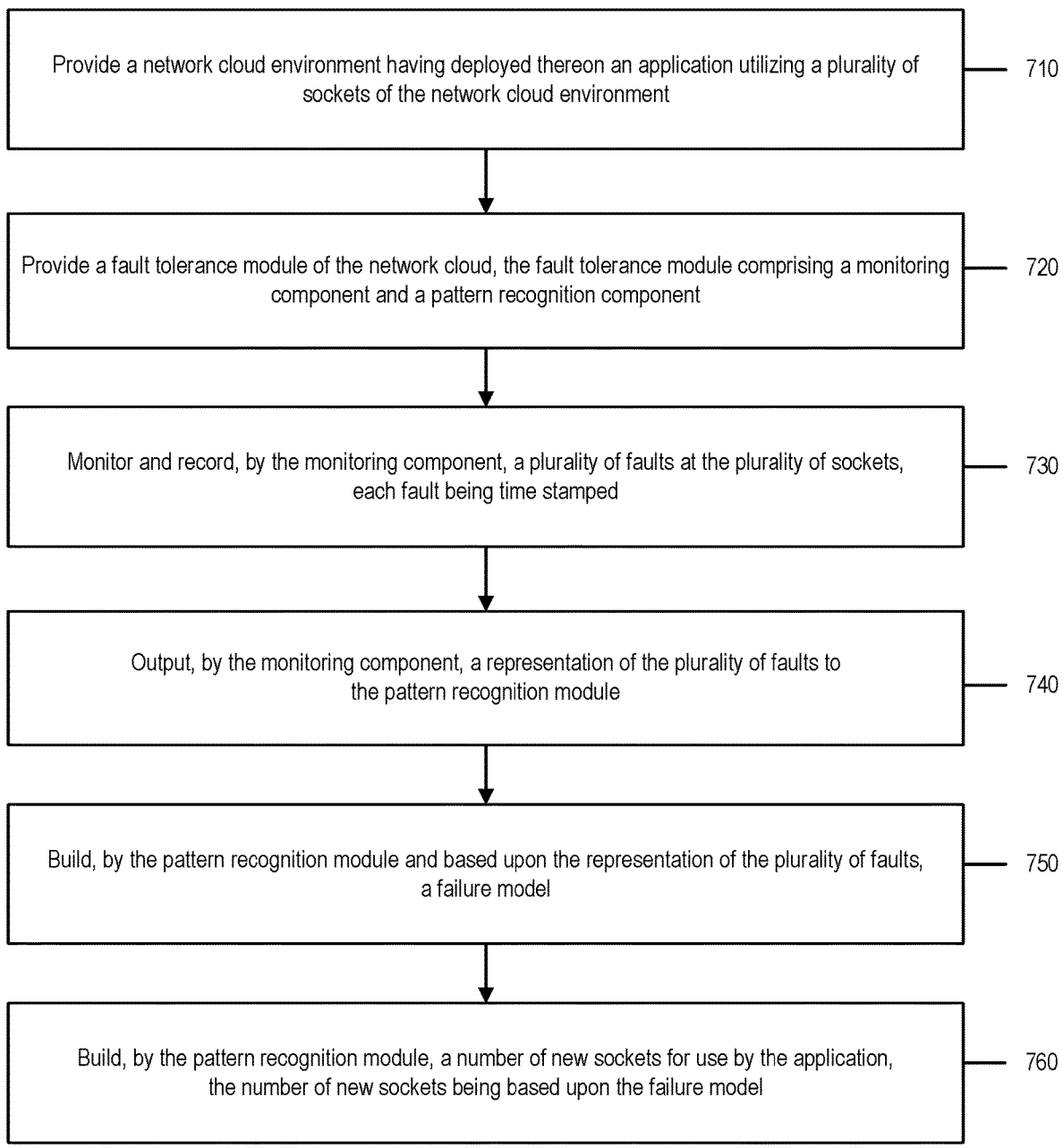
FIG. 7 is a flowchart of a method for fault tolerance in a network cloud environment, in accordance with an embodiment.

FIG. 7 is a flowchart of a method for fault tolerance in a network cloud environment, in accordance with an embodiment.

In accordance with an embodiment, at step 710, the method can provide a network cloud environment having deployed thereon an application utilizing a plurality of sockets of the network cloud environment.

In accordance with an embodiment, at step 720, the method can provide a fault tolerance module of the network cloud, the fault tolerance module comprising a monitoring component and a pattern recognition component.

In accordance with an embodiment, at step 730, the method can monitor and record, by the monitoring component, a plurality of faults at the plurality of sockets, each fault being time-stamped.

In accordance with an embodiment, at step 740, the method can output, by the monitoring component, a representation of the plurality of faults to the pattern recognition module.

In accordance with an embodiment, at step 750, the method can build, by the pattern recognition module and based upon the representation of the plurality of faults, a failure model.

In accordance with an embodiment, at step 760, the method can build, by the pattern recognition module, a number of new sockets for use by the application, the number of new sockets being based upon the failure model.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function.

In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed.

Additionally, where embodiments of the present invention have been described using a particular series of transactions and steps, it should be apparent to those skilled in the art that, unless stated, the embodiment does not exclude performance of additional transactions and steps.

Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention.

Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for fault tolerance in a network cloud environment, comprising:
   a network cloud environment having deployed thereon an application utilizing a plurality of sockets of the network cloud environment;
   a fault tolerance module of the network cloud, the fault tolerance module comprising a monitoring component and a pattern recognition component;
   wherein the monitoring component monitors and records a plurality of faults at the plurality of sockets, each fault being time-stamped;
   wherein the monitoring component outputs a representation of the plurality of faults to the pattern recognition module;
   wherein the pattern recognition module builds, based upon the representation of the plurality of faults, a failure model;
   wherein the pattern recognition module builds a number of new sockets for use by the application, the number of new sockets being based upon the failure model; and
   wherein the fault tolerance module further comprises a socket pool maintainer module, wherein the socket pool maintainer module opens a set of the built new sockets based upon a difference between a set of plurality of sockets currently available and a prediction of a number of sockets needed based upon the failure model.

2. The system of claim 1, wherein the fault tolerance module further comprises a read socket consumer module, wherein the ready socket consumer module provides the opened set of the built new sockets to the application.

3. The system of claim 2, wherein the socket pool maintainer module runs in a while loop while the application is running.

4. The system of claim 3, wherein the pattern recognition module runs on a separate virtual machine from the rest of the monitoring component.

5. The system of claim 4, wherein the application comprises a distributed data grid application.

6. The system of claim 4, wherein the application comprises an application server.

7. A method for fault tolerance in a network cloud environment, comprising:
   providing a network cloud environment having deployed thereon an application utilizing a plurality of sockets of the network cloud environment;
   providing a fault tolerance module of the network cloud, the fault tolerance module comprising a monitoring component and a pattern recognition component;
   monitoring and recording, by the monitoring component, a plurality of faults at the plurality of sockets, each fault being time-stamped;
   outputting, by the monitoring component, a representation of the plurality of faults to the pattern recognition module;
   building, by the pattern recognition module and based upon the representation of the plurality of faults, a failure model; and
   building, by the pattern recognition module, a number of new sockets for use by the application, the number of new sockets being based upon the failure model;
   wherein the fault tolerance module further comprises a socket pool maintainer module, wherein the socket pool maintainer module opens a set of the built new sockets based upon a difference between a set of plurality of sockets currently available and a prediction of a number of sockets needed based upon the failure model.

8. The method of claim 7, wherein the fault tolerance module further comprises a read socket consumer module, wherein the ready socket consumer module provides the opened set of the built new sockets to the application.

9. The method of claim 8, wherein the socket pool maintainer module runs in a while loop while the application is running.

10. The method of claim 9, wherein the pattern recognition module runs on a separate virtual machine from the rest of the monitoring component.

11. The method of claim 10, wherein the application comprises a distributed data grid application.

12. The method of claim 10, wherein the application comprises an application server.

13. A non-transitory computer readable storage medium having instructions thereon for fault tolerance in a network cloud environment, which when read an executed by a computer cause the computer to perform steps comprising:
   providing a network cloud environment having deployed thereon an application utilizing a plurality of sockets of the network cloud environment;
   providing a fault tolerance module of the network cloud, the fault tolerance module comprising a monitoring component and a pattern recognition component;
   monitoring and recording, by the monitoring component, a plurality of faults at the plurality of sockets, each fault being time-stamped;
   outputting, by the monitoring component, a representation of the plurality of faults to the pattern recognition module;
   building, by the pattern recognition module and based upon the representation of the plurality of faults, a failure model; and
   building, by the pattern recognition module, a number of new sockets for use by the application, the number of new sockets being based upon the failure model;
   wherein the fault tolerance module further comprises a socket pool maintainer module, wherein the socket pool maintainer module opens a set of the built new sockets based upon a difference between a set of plurality of sockets currently available and a prediction of a number of sockets needed based upon the failure model.

14. The non-transitory computer readable storage medium of claim 13 wherein the fault tolerance module further comprises a read socket consumer module, wherein the ready socket consumer module provides the opened set of the built new sockets to the application.

15. The non-transitory computer readable storage medium of claim 14, wherein the socket pool maintainer module runs in a while loop while the application is running.

16. The non-transitory computer readable storage medium of claim 15, wherein the pattern recognition module runs on a separate virtual machine from the rest of the monitoring component.

17. The non-transitory computer readable storage medium of claim 16, wherein the application comprises a distributed data grid application.

\* \* \* \* \*